US008625427B1

(12) United States Patent
Terry et al.

(10) Patent No.: US 8,625,427 B1
(45) Date of Patent: Jan. 7, 2014

(54) MULTI-PATH SWITCHING WITH EDGE-TO-EDGE FLOW CONTROL

(75) Inventors: John M. Terry, San Jose, CA (US); Joseph Juh-En Cheng, Palo Alto, CA (US); Jan Bialkowski, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 609 days.

(21) Appl. No.: 12/553,689

(22) Filed: Sep. 3, 2009

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ........... 370/235; 370/236; 370/367; 370/370; 370/388; 370/412; 370/413; 370/414; 370/415; 370/416; 370/417; 370/418

(58) Field of Classification Search
USPC .............. 370/231, 235, 236, 367, 370, 388, 370/412–418; 709/235
See application file for complete search history.

(56) References Cited

U.S. PATENT DOCUMENTS

| 4,493,021 | A | 1/1985 | Agrawal |
| 4,627,052 | A | 12/1986 | Hoare |
| 4,677,588 | A | 6/1987 | Benjamin |
| 4,688,170 | A | 8/1987 | Waite |
| 4,706,081 | A | 11/1987 | Hart |
| 4,720,950 | A | 1/1988 | Bayer |
| 4,755,986 | A | 7/1988 | Hirata |
| 4,755,992 | A | 7/1988 | Albal |
| 4,757,497 | A | 7/1988 | Beierle |
| 4,779,092 | A | 10/1988 | Takao |
| 4,797,881 | A | 1/1989 | Ben-Artzi |
| 4,813,037 | A | 3/1989 | Debuysscher |
| 4,864,559 | A | 9/1989 | Perlman |
| 4,890,280 | A | 12/1989 | Hirata |
| 4,894,822 | A | 1/1990 | Buhrke |
| 4,897,841 | A | 1/1990 | Gang, Jr. |
| 4,920,531 | A | 4/1990 | Isono |
| 4,933,938 | A | 6/1990 | Sheehy |
| 4,935,926 | A | 6/1990 | Herman |
| 4,939,724 | A | 7/1990 | Ebersole |
| 4,947,390 | A | 8/1990 | Sheehy |
| 5,018,137 | A | 5/1991 | Backes |

(Continued)

OTHER PUBLICATIONS

Varghese, George et al., "Transparent Interconnection of Incompatible Local Area Networks Using Bridges", IEEE Journal on Selected Areas in Communications, vol. 8, No. 1, Jan. 1991, pp. 42-48.

(Continued)

*Primary Examiner* — Benjamin H Elliott, IV
(74) *Attorney, Agent, or Firm* — Shun Yao; Park, Vaughan, Fleming & Dowler LLP

(57) ABSTRACT

One embodiment of the present invention provides a system that facilitates flow control of multi-path-switched data frames. During operation the system transmits from an ingress edge device data frames destined to an egress edge device across different switched paths based on queue status of a core switching device and queue status of the egress edge device. The egress edge device is separate from the core switching device.

21 Claims, 10 Drawing Sheets

(56) References Cited

U.S. PATENT DOCUMENTS

| | | | |
|---|---|---|---|
| 5,079,767 | A | 1/1992 | Perlman |
| 5,081,623 | A | 1/1992 | Ainscow |
| 5,086,426 | A | 2/1992 | Tsukakoshi |
| 5,088,090 | A | 2/1992 | Yacoby |
| 5,105,424 | A | 4/1992 | Flaig |
| 5,109,483 | A | 4/1992 | Baratz |
| 5,136,716 | A | 8/1992 | Harvey |
| 5,142,622 | A | 8/1992 | Owens |
| 5,166,926 | A | 11/1992 | Cisneros |
| 5,226,039 | A | 7/1993 | Frank |
| 5,249,292 | A | 9/1993 | Chiappa |
| 5,274,631 | A | 12/1993 | Bhardwaj |
| 5,301,303 | A | 4/1994 | Abraham |
| 5,309,437 | A | 5/1994 | Perlman |
| 5,325,358 | A | 6/1994 | Goeldner |
| 5,349,674 | A | 9/1994 | Calvert |
| 5,390,173 | A | 2/1995 | Spinney |
| 5,442,750 | A | 8/1995 | Harriman, Jr. |
| 5,450,439 | A | 9/1995 | Kato |
| 5,530,842 | A | 6/1996 | Abraham |
| 6,486,983 | B1 * | 11/2002 | Beshai et al. .................. 398/54 |
| 6,826,147 | B1 * | 11/2004 | Nandy et al. .................. 370/229 |
| 6,992,984 | B1 * | 1/2006 | Gu .................. 370/235 |
| 7,027,404 | B2 * | 4/2006 | Sreejith et al. .................. 370/238 |
| 7,080,168 | B2 * | 7/2006 | Dasgupta et al. .................. 710/29 |
| 7,139,240 | B2 | 11/2006 | Kreuzenstain |
| 7,209,445 | B2 * | 4/2007 | Miller et al. .................. 370/235 |
| 7,313,093 | B1 * | 12/2007 | Eatherton et al. .................. 370/230 |
| 7,787,480 | B1 * | 8/2010 | Mehta et al. .................. 370/401 |
| 7,864,757 | B2 * | 1/2011 | Hall et al. .................. 370/388 |
| 7,898,959 | B1 * | 3/2011 | Arad .................. 370/235 |
| 2002/0141427 | A1 * | 10/2002 | McAlpine .................. 370/413 |
| 2005/0002334 | A1 * | 1/2005 | Chao et al. .................. 370/230 |
| 2005/0201400 | A1 * | 9/2005 | Park et al. .................. 370/412 |
| 2009/0046719 | A1 * | 2/2009 | Ashwood Smith .......... 370/392 |
| 2009/0046731 | A1 * | 2/2009 | George et al. .................. 370/404 |
| 2010/0061238 | A1 * | 3/2010 | Godbole et al. .................. 370/235 |
| 2010/0061240 | A1 * | 3/2010 | Sindhu et al. .................. 370/235 |
| 2010/0246388 | A1 * | 9/2010 | Gupta et al. .................. 370/225 |

OTHER PUBLICATIONS

Perlman, Radia et al., "Rbridges: Base Protocol Specification", TRILL Working Group, Jan. 7, 2009.

Estrin, Deborah "Interconnection Protocols for Interorganization Networks" IEEE Journal on Selected Areas in Communications, vol. Sac-5, No. 9, Dec. 1987, pp. 1480-1491.

Gerla, Mario et al., "Congetion Control in Interconnected LANs" Jan. 1988, vol. 2, No. 1, pp. 72-76.

Giacopelli, James N. et al., "Sunshine: A High-Performance Self-Routing Broadband Packet Switch Architecture" IEEE Journal on Selected Areas in Communications, vol. 9, No. 8, Oct. 1991, pp. 1289-1298.

Giessler, Alfred et al., "Flow Control Based on Buffer Classes" IEEE Transactions on Communications, vol. com-29, No. 4, Apr. 1981, pp. 436-443.

Touch, J. et al., "Transparent Interconnection of Lots of Links (TRILL): Problem and Applicability Statement" Network Working Group, May 2009.

Markowsky, George et al., "An Evaluation of Local Path ID Swapping in Computer Networks" IEEE Transactions on Communications vol. Com-29, No. 3, Mar. 1981, pp. 329-336.

Perlman, Radia et al., "Choosing the Appropriate ISO Layer for LAN Interconnection" Jan. 1988, vol. 2, No. 1, pp. 81-86.

* cited by examiner

MULTI-PATH SWITCHING WITH EDGE-TO-EDGE FLOW CONTROL

BACKGROUND

1. Field

The present disclosure relates to communication networks. More specifically, the present disclosure relates to a method and system for facilitating multi-path switching with edge-to-edge flow control.

2. Related Art

The proliferation of the Internet and e-commerce continues to fuel evolutions in the telecom and network industries. Convergence in the underlying network architectures often takes place at a pace faster than the lifespan of most network equipment. For example, a large enterprise network today may contain Internet Protocol (IP) networks, storage area networks (SANs), Ethernet-based access networks, and leased lines and switches from telephone service providers. How to manage and fully utilize the equipment capacity in a heterogeneous environment remains an ongoing challenge.

To maximize returns on capital expenditures, many network architects prefer re-using existing equipment to switch data packets of different formats and aggregating low-speed switch ports to provision high-speed logical links. Equipment vendors often provide the capability of mix-and-matching the latest equipment with existing equipment to boost switching capacity and accommodate different types of traffic.

Although mixing different types of network equipment can save costs, it also presents inter-operability challenges. For example, when multiple devices are combined into a high-capacity switching system, the flow of packets within such a system can be difficult to control, and unregulated packet flows might prevent the system from reaching its full capacity.

SUMMARY

In embodiments of the present invention, the problem of flow control in a multi-path switched network is solved by using an edge-to-edge credit mechanism and a link-level credit mechanism at an edge device.

One embodiment of the present invention provides a system that facilitates flow control of multi-path-switched data frames. During operation, the system receives data frames from a source device at an ingress edge device. The system also maintains queue status for queues between the ingress edge device and at least one separate core switching device and for queues between the ingress edge device and a separate egress edge device which is the destination of the received data frames. The system further transmits the received data frames from the ingress edge device, the data frames destined to the egress edge device. In addition, the system transmits the data frames across different switched paths based on the queue status of at least one core switching device and the queue status of the egress edge device.

In a variation on this embodiment, the system transmits the data frames via a plurality of output ports of the ingress edge device, each of which is coupled to a different core switching device and is part of a different switched path leading to the egress device.

In a variation on this embodiment, the queue status of the egress edge device corresponds to a queue dedicated to an egress port on the egress edge device and the ingress edge device.

In a variation on this embodiment, the system receives information indicative of the queue status of the egress edge device, wherein this information is attached to a data frame transmitted from the egress edge device to the ingress edge device.

In a variation on this embodiment, the system receives information indicative of the queue status of the egress edge device, wherein this information is contained in a stand-alone frame that does not carry payload data.

In a variation on this embodiment, the core switching device is a Fibre Channel (FC) switch. The system encapsulates a respective data frame based on an FC frame format prior to transmitting the data frame.

In a further variation, the data frame is an Ethernet frame.

In a further variation, the queue status of the core switching device is indicated by an FC credit count.

One embodiment of the present invention provides an ingress edge device. The ingress edge device includes a source device port, a plurality of core device ports, queue status registers, a flow-control mechanism, and a transmission mechanism. The source device port couples to a data frame source device to receive data frames. The core device ports couples to at least one separate core switching device to provide data frames. The queue status registers store status of queues between the ingress edge device and said at least one core switching device and queues between the ingress edge device and a separate egress edge device which is the destination of the received data frames. The flow-control mechanism is coupled to the queue status registers and determines a queue status of a respective core switching device and a queue status of a respective egress edge device. The flow-control mechanism also provides values to the queue status registers. The transmission mechanism is coupled to the source device port, the core device ports, and the queue status registers, and transmits received data frames destined to the egress edge device across different switched paths using different core device ports. Furthermore, a respective core device port is selected based on the queue status of the at least one core switching device and the queue status of the egress edge device maintained in the queue status registers.

One embodiment of the present invention provides a system for facilitating flow control of multi-path-switched data frames. This system includes an ingress edge device, at least one core switching device, and an egress edge device. The core switching device includes a plurality of ingress edge device ports for coupling to the ingress edge device via a plurality of core device ports on the ingress edge device, at least one egress edge device port, a switching element coupling the ingress device ports and the at least one egress edge device port, and a core queue-status providing mechanism for providing queue status information to the ingress edge device. The egress edge device includes at least one core device port, a destination device port for coupling to a data frame sink device, a switching element coupling the core device port and destination device port, and an edge queue-status providing mechanism for providing queue status information to said ingress edge device. The system further includes a plurality of links coupled to the core device ports on the egress edge device and the ingress edge device ports on the ingress edge device.

BRIEF DESCRIPTION OF THE FIGURES

This disclosure is illustrated by way of example and not by way of limitation in the accompanying drawings. Like reference numerals refer to similar elements.

DETAILED DESCRIPTION

Figure 1:
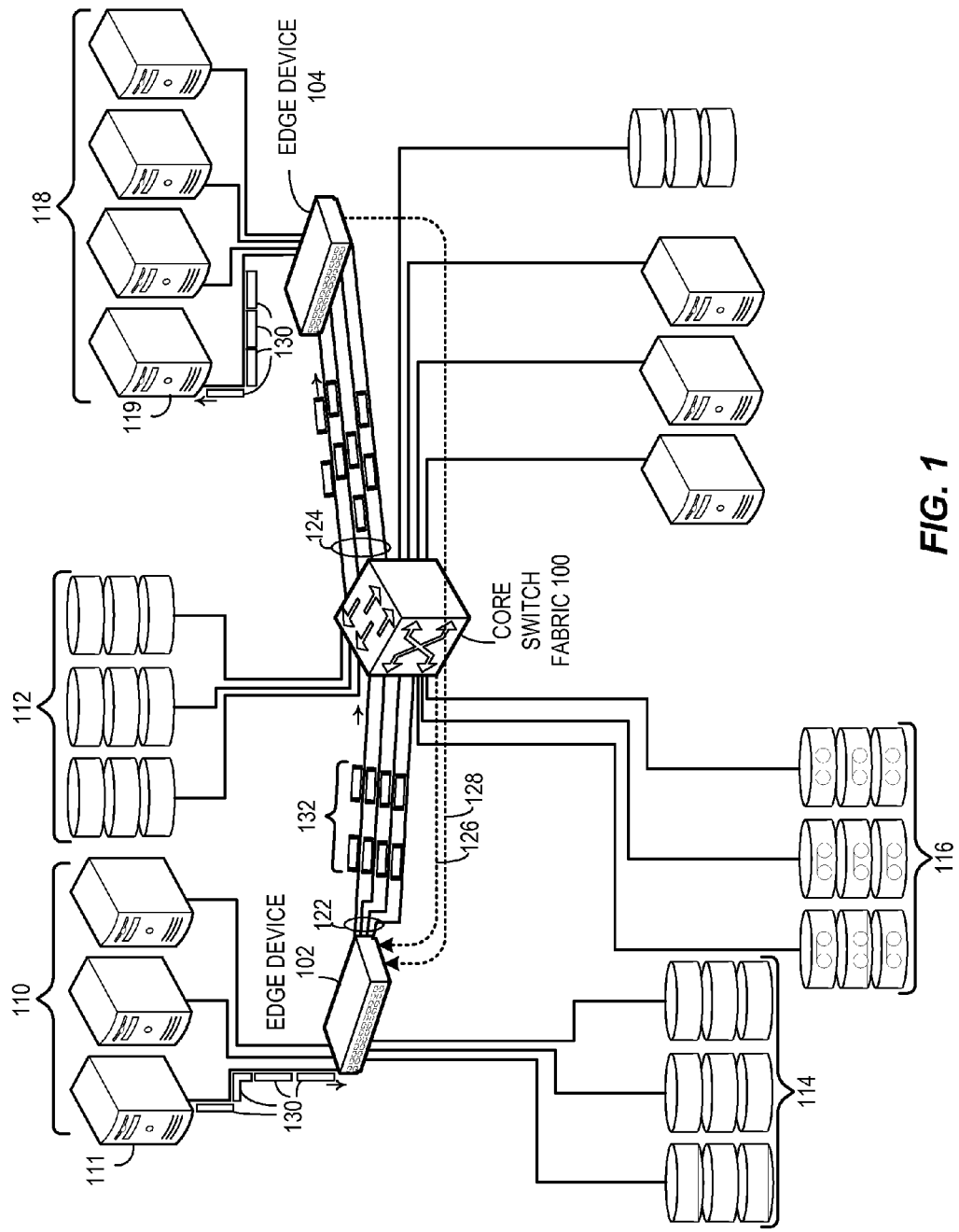
FIG. 1 illustrates an exemplary network that provides multi-path switching with edge-to-edge flow control, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments of the present invention provide a new type of edge device that solves the flow-control problem in a multi-path switched network by using an edge-to-edge credit mechanism and a link-level credit mechanism at an edge device.

This new edge device can interface with core switching devices and facilitate multi-path switching with both path-level and link-level flow control in a heterogeneous network environment. Such multi-path switching can effectively circumvent the bottleneck caused by a single switch's limited switching capacity. The edge device has a number of external-facing ports, which can couple to any network equipment, and a number of fabric ports which can couple to core switching devices or other edge devices. The edge device transmits frames destined to a common egress edge device across multiple links leading to different switching devices, thereby allowing the frames to be delivered over multiple switched paths. At the same time, the ingress edge device maintains both edge-to-edge flow control in conjunction with the egress edge device and link-level flow control with the core switching devices. Congestion can be avoided at both the egress edge devices and the core switching devices. Consequently, high network utilization can be achieved without overloading the network.

In this disclosure, the term "edge device" is loosely defined and in general refers to a network device that is situated between an end-user device and a switch or traffic aggregation equipment situated closer to the core of the network. An edge device can provide switching functions. A "core device" can be a switch or other network equipment situated between two edge devices. An "ingress edge device" refers to an edge device that accepts traffic from end devices and forwards the traffic to a core device. An "egress edge device" refers to an edge device that accepts traffic from a core device and forwards the traffic to end devices. An "ingress port" on a device refers to an input port, and an "egress port" refers to an output port. An "external port" on an edge device refers to a port (ingress or egress) that couples to an end device. A "fabric port" on an edge device refers to a port (ingress or egress) that couples to a core device.

"Flow control" refers to the mechanism or operations performed by one or more devices to throttle and amount of data passing through a link or switched path, often for the purposes of avoiding congestion. "Congestion" refers to the situation where data arrives faster than they can be processed which causes queue overflow within a network. Typically, congestion can occur when data arrives faster than a port can transmit them. Congestion can also occur when a processing unit (e.g., a lookup engine) cannot process incoming frames fast enough to keep up with the arriving data.

Network Architecture

FIG. 1 illustrates an exemplary network that provides multi-path switching with edge-to-edge flow control, in accordance with an embodiment of the present invention. The architecture of this exemplary network is described first as follows. An edge device 102 is coupled to a core switch fabric 100 via a number of links 122, and an edge device 104 is coupled to core switch fabric 100 via a number of links 124. Core switch fabric 100 can operate on a frame format that is the same as or different from the frame format of the external ports of edge devices 102 and 104. In one embodiment, core switch fabric 100 can operate on a Fibre Channel (FC) format, while edge devices 102 and 104 accept Ethernet frames from external devices. Furthermore, as illustrated in FIG. 2B, core switch fabric 100 can include a number of switching devices, and data frames may traverse different paths via different switching devices within switch fabric 100.

In this example, a number of network appliances operating on an FC frame format, such as back-up tape drives 116 and disk array 112, can be coupled to core switch 100. Core switch fabric 100 can switch traffic among these FC-based appliances. In addition, a number of Ethernet-based end devices, such as server farm 110, disk array 114, and server farm 118, are coupled to edge devices 102 and 104. The switching of traffic among these Ethernet-based devices is also performed by core switch fabric 100, because edge devices 102 and 104 can encapsulate an Ethernet frame within an FC frame.

As illustrated in FIG. 1, link group 122 includes multiple physical links (e.g., 4.25 Gbps or 8.5 Gbps FC links). Edge device 102 can use any physical link within link group 122 to transmit data frames which are to be switched by core switch fabric 100. Data frames destined to the same destination (e.g., server farm 118) can traverse different switched paths within core switch fabric 100 and be delivered at the destination.

Similarly, edge device 104 can receive data frames from any physical link within link group 124 from core switch fabric 100. Note that edge devices 102 and 104 can each attach a sequence number to an Ethernet frame and encapsulate the Ethernet frame and the sequence number in FC headers. This feature allows an ingress edge device to "spray" the encapsulated frames across the physical links leading to different switched paths while still maintaining the frame order at the egress edge device.

In embodiments of the present invention, edge-to-edge flow control is achieved in the following manner. Egress edge device 104 typically maintains a separate edge-to-edge queue for a respective egress external port (such as the egress external port coupled to a server 119) and a particular ingress edge device, i.e., a queue is dedicated to an (egress port, ingress edge device) pair. The state of this queue (e.g., the available space) indicates how much data edge device 104 can receive for transmission via the corresponding egress external port before congestion occurs at that egress external port. Note that congestion occurs at an egress port when data frames arrive faster than the egress external port can transmit them.

During operation, edge device 104 communicates the state of this queue to the ingress edge device 102 via an edge-to-edge signaling path 128. When transmitting frames destined for this particular egress port, ingress edge device 102 only allows a frame to enter the core switch when the corresponding queue at egress edge device 104 is not full. In this way, the system can prevent congestion at the egress external ports on the egress edge devices.

In addition, ingress edge device 102 also maintains link-level flow control with the core switching devices. As mentioned above, core switch fabric 100 may contain a number of switching devices, and each core switching device provide a different switched path from a give ingress edge device to an egress edge device. Before transmitting a frame to core switch fabric 100, edge device 102 identifies one or more core switching devices with available switching capacity within core switch fabric 100 (and the corresponding outgoing fabric links). Subsequently, ingress edge device 102 transmits frames destined for egress edge device 104 onto these different fabric links. This link-level flow control mechanism prevents congestion at core switch fabric 100, while the edge-to-edge flow control mechanism prevents congestion at the egress edge device.

The use of both edge-to-edge flow control and link-level flow control can effectively prevent congestions both at the egress edge and the core.

In one embodiment, the edge-to-edge flow control information (from the egress edge device to the ingress edge device) is piggy-backed onto a data frame traveling from the egress edge device to the ingress edge device, in which case the "egress" edge device is actually the ingress, and the "ingress" edge device is actually the egress, since an edge device can function as both ingress and egress. The edge-to-edge flow control information can also be carried in a stand-alone frame which does not carry payload data traveling from the egress edge device to the ingress edge device. The link-level flow control between the core switch fabric and an ingress edge device can use the existing FC transmission credit system. In one embodiment, a physical link may contain multiple FC virtual channels, and the link-level credits are counted on a per-virtual-channel basis. Other signaling format and protocols can also be used.

In the example in FIG. 1, assume that a server 111 in server farm 110 transmits a stream of Ethernet frames 130 which are destined for a server 119 in server farm 118. Edge device 102 receives and attaches sequence numbers to Ethernet frames 130, and encapsulates them with FC headers (and optionally with additional header information). Edge device 102 then determines whether a per-priority edge-to-edge credit pool corresponding to the egress port on edge device 104 coupling to server 119 has sufficient credit for transmitting the next Ethernet frame. When there is sufficient edge-to-edge credit, edge device 102 then determines which link among link group 122 has sufficient credit from core switch fabric 100. Edge device 102 then forwards FC encapsulated frames 132 to core switch fabric 100 via the available links within link group 122.

Subsequently, core switch fabric 100 receives FC encapsulated frames 132 and allows each frame to be switched by a different switching device within switching fabric 100 (individual switching devices are shown in FIG. 2B). Consequently, FC encapsulated frames 132 are transmitted onto link group 124, each frame traversing a different switched path within switch fabric 100 and traveling on a different physical link in link group 124. Note that due to the different switched path within switch fabric 100, the order of FC encapsulated frames 132 can be altered. Edge device 104 then re-orders frames 132 based on their sequence numbers. Edge device 104 also removes the encapsulation information (FC headers, sequence numbers, etc.) from frames 132 before forwarding the corresponding Ethernet frame 130 to server 119.

The aforementioned multi-path-switching feature is different from the existing hash-based Ethernet trunking methods. First, Ethernet trunking is used to aggregate physical links coupling two devices. That is, the starting points of all the trunked links are at the same transmitting device, and the ending points of all the trunked links are at the same receiving device. In embodiments of the present invention, the ending points of the grouped links (for example, link group 122 in FIG. 1), can be different switching devices (see more detailed description in conjunction with FIG. 2B).

Second, in the existing Ethernet-trunking methods, to achieve in-order frame delivery, Ethernet frames with the same layer-2 or layer-3 addresses or layer-4 port numbers are always sent to the same physical link, because the link selection is based on a hash value of such addresses or port numbers. The resulting load distribution across the physical links in a trunk is determined by the load in different layer-2 or layer-3 source-destination pairs or layer-4 sessions. Hence, it is difficult for the edge device to attain a desired load distribution (e.g., an even load distribution across all the trunked links).

In contrast, in embodiments of the present invention, an edge device can forward Ethernet frames in an arbitrary distribution pattern among the physical links leading to different switching devices. For example, in a link group containing four physical links, the edge device can forward Ethernet frames carrying data for the same TCP session or the same IP source-destination pair across all four physical links to achieve an even load distribution among different switching devices. This type of arbitrary load distribution among different switched paths is not possible in hash-based trunking schemes.

The multi-path-switching technique disclosed herein is also distinct from conventional FC trunking. First, as explained above, the present multi-path-switching techniques involves transmitting frames on different physical links coupled to different switching devices, whereas FC trunking is limited to aggregating physical links coupled to the same switching device on the receiving end. Second, FC trunking relies on the measured latency on each trunked link to ensure in-order delivery. This approach would not work with multi-path switching, because the latency incurred in each switching device on a respective path (e.g., input queuing delay, processing delay, and output queuing delay) is not fixed and typically depends on the load on the switching device.

The edge-to-edge flow control in the present multi-path-switching technique is distinct from layer-4 flow control, such as TCP flow control. A TCP communication session uses a sliding window mechanism to control the end-to-end packet flow. A TCP session is based on a connection-oriented model, is specific to a source/destination port pair, and has no control of how the data packets are routed or switched on lower layers. In other words, the TCP flow control is only designed to avoid congestion at the end host, but does not prevent lower-layer link congestion. Furthermore, a TCP session assumes a single "pipe," i.e., a single path, between two end points, and has no control over how the packets are switched from the source to destination, whereas embodiments of the present invention facilitates multi-path switching between an ingress edge device and an egress edge device. In contrast, embodiments of the present invention facilitate multi-path switching with both edge-to-edge flow control and link-level flow control over multiple switched paths. This innovative flow-control mechanism not only prevents congestion at the egress edge device, but also prevents congestion at core switching devices along different switched paths from the ingress to the egress.

Figure 2A:
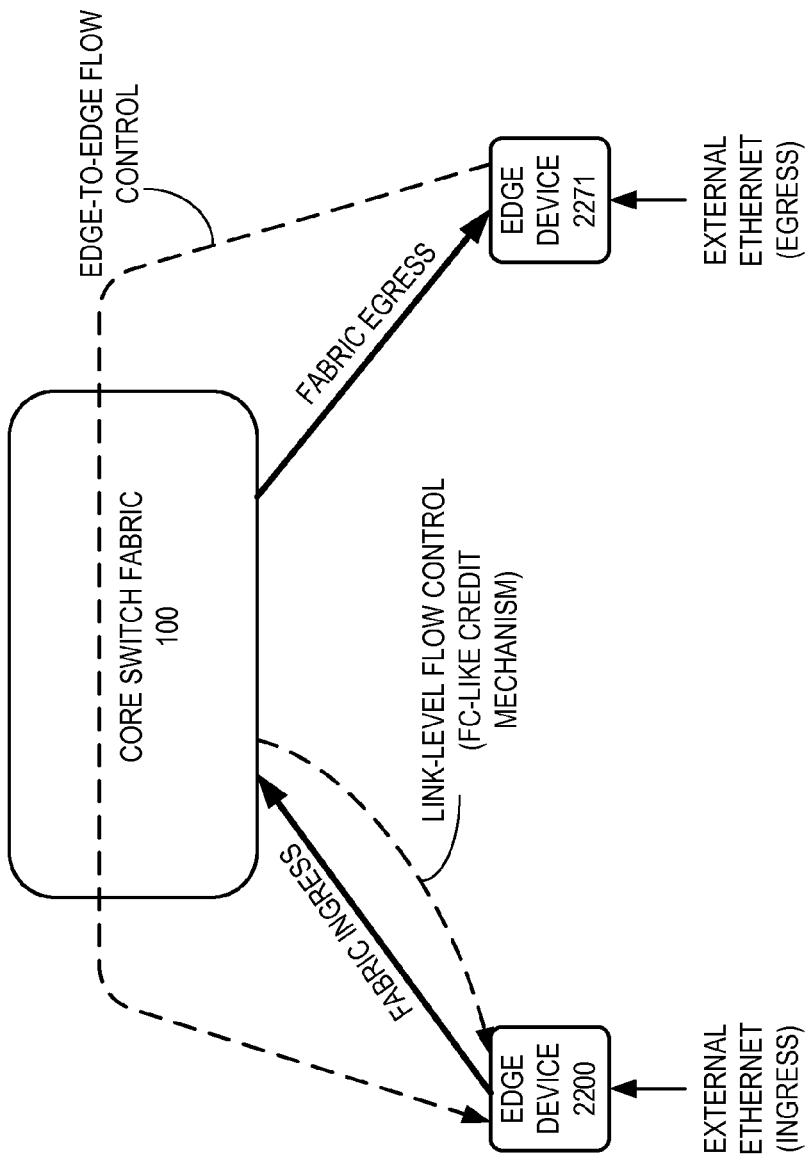
FIG. 2A illustrates a logical block diagram of a switching system that facilitates multi-path switching with edge-to-edge flow control, in accordance with an embodiment of the present invention.
Figure 2B:
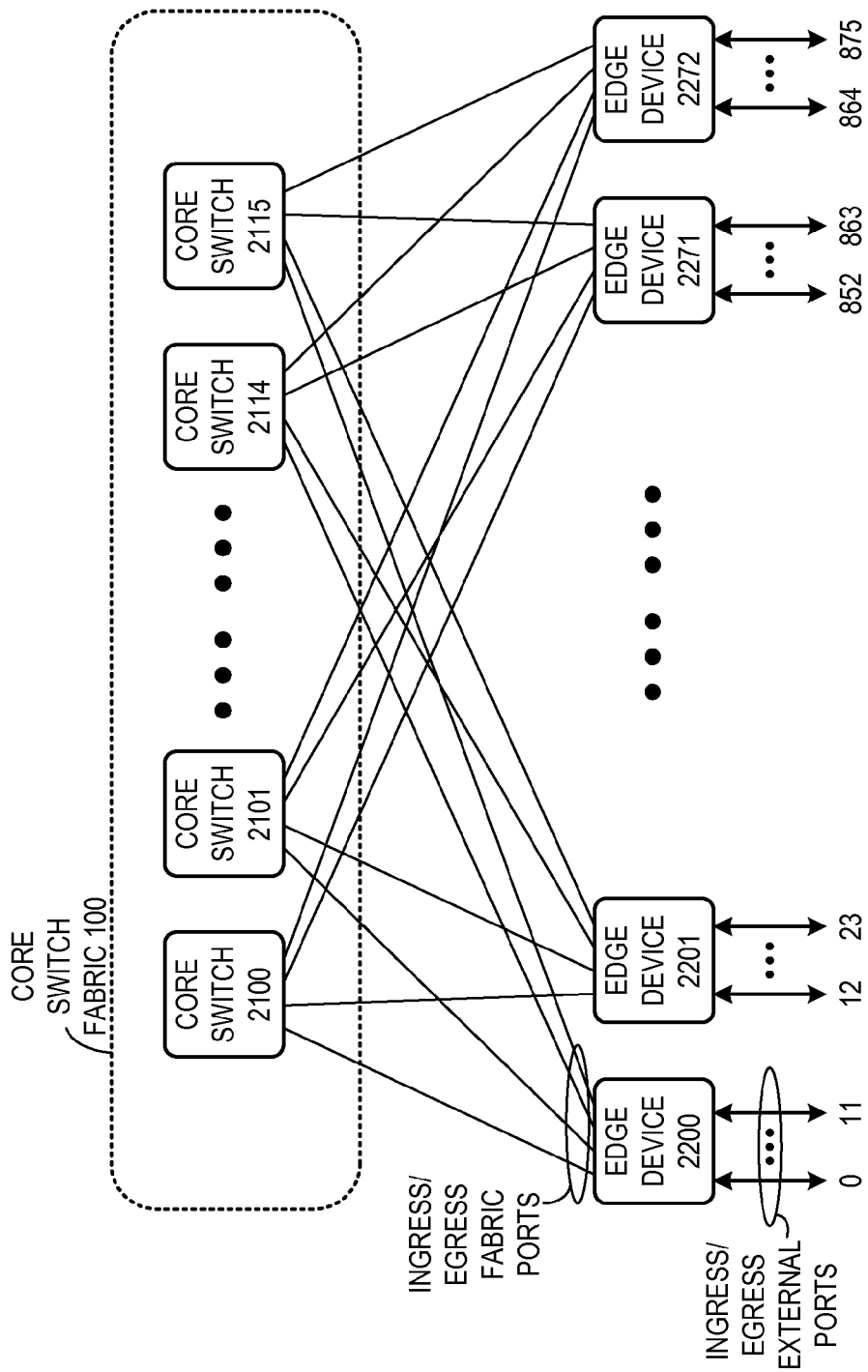
FIG. 2B illustrates an exemplary configuration of edge devices and a core switching device which facilitate multi-path switching with edge-to-edge flow control, in accordance with an embodiment of the present invention.

FIG. 2A illustrates a logical block diagram of a switching system that facilitates multi-path switching with edge-to-edge flow control, in accordance with an embodiment of the present invention. In this example, two edge devices 220 and 2271 are coupled to core switch fabric 100 via multiple physical links. Each physical link couples to a separate core switching device within core switch fabric 100 (see FIG. 2B for details). Assume traffic flows from edge device 2200 to edge device 2271. Edge device 2200 has a number of external-facing ingress Ethernet ports, and edge device 2271 has a number of external-facing egress Ethernet ports. The physical links coupling edge device 2200 and core switch fabric 100 are referred to as "fabric ingress" links. Similarly, physical links coupling core switch fabric 100 and edge device 2271 are referred to as "fabric egress" links.

During operation, edge device 2271 communicates from time to time edge-to-edge flow control information with respect to a given egress port back to edge device 2200. In addition, core switch fabric 100 also communicates link-level flow control information to edge device 2200, using an FC-like credit mechanism. This way, by throttling its frame transmission based on both edge-to-edge and link-level flow control, edge device 2200 can effectively avoid overloading the fabric ingress links as well as the egress port on edge device 2271.

FIG. 2B illustrates an exemplary configuration of edge devices and a core switching device which facilitate multi-path switching with edge-to-edge flow control, in accordance with an embodiment of the present invention. In this example, 73 edge devices 2200-2272 and 16 core switches 2100-2115 from a high-capacity switching system. Core switches 2100-2115 form an exemplary embodiment of core switch fabric 100 as illustrated in FIG. 1. Core switch fabric 100 may include additional switching devices, and some of the ports on these switching devices may be coupled to end devices, such as disk array 112 in the example illustrated in FIG. 1. In one embodiment, core switches 2100-2115 are FC switches. These core switches can also be based on other standard or proprietary frame format. Furthermore, each edge device has 12 external ports, which operate on the Ethernet frame format. In total, there are 876 external Ethernet ports, labeled as ports 0, 1, 2, ..., 875, respectively. A respective edge device also has 16 fabric ports, each of which couples to a different core switch. Correspondingly, a respective core switch has 73 ports, each coupling to a different edge device.

The links between the core switches and edge devices can be considered as "internal" links with respect to core switch fabric 100. In other words, the entire system, which includes core switch fabric 100 and edge devices 2200-2272, can appear to be one piece of network equipment (for example, placed in a single rack) to the outside world. The core switches serve as the back-end switch fabrics for forwarding traffic from an ingress external port to an egress external port. A data frame traveling from an ingress external port to an egress external port can take one of the 16 switched paths, each of which traverses one of the 16 core switches 2100-2115. Note that the terms "ingress" and "egress" are used here to indicate the direction of traffic flow. In reality, an external port can be bi-directional (for example, a Gigabit Ethernet (GbE) port or a 10G Ethernet port).

In one embodiment, a respective edge device can use all 16 fabric links (and correspondingly all 16 switched paths) for forwarding data frames to the same egress external port, independent of the frames' layer-2 or layer 3 addresses or layer-4 identifiers.

Figure 2C:
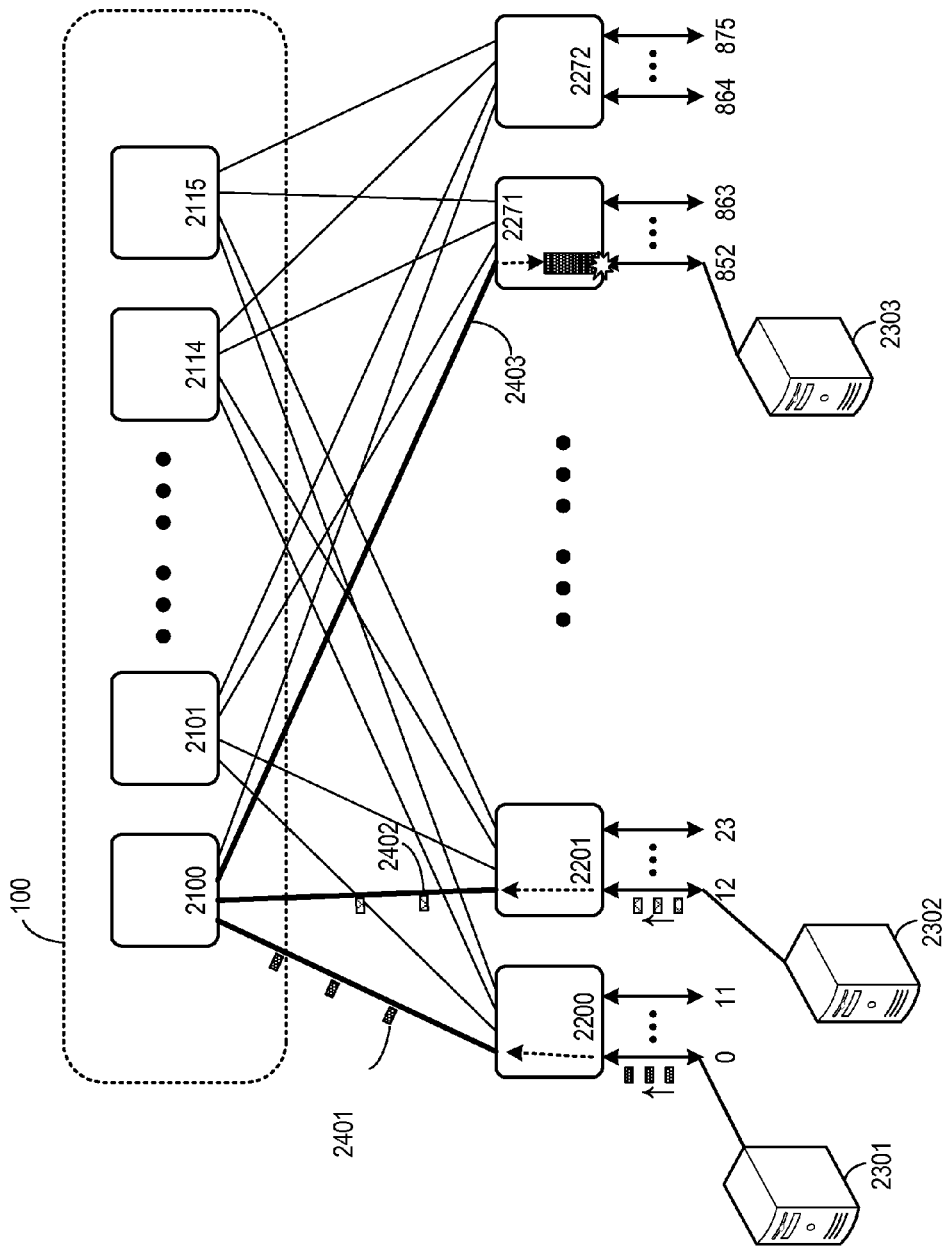
FIG. 2C illustrates an exemplary configuration of a multi-path switching system with edge-to-edge flow control disabled, in accordance with an embodiment of the present invention.

FIG. 2C illustrates an exemplary configuration of a multi-path switching system with edge-to-edge flow control disabled, in accordance with an embodiment of the present invention. In this example, assume that only link-level flow control is available between egress edge device 2271 and core switch fabric 100. In addition, a host 2301 is coupled to ingress edge device 2200 via external port 0, a host 2302 is coupled to ingress edge device 2201 via external port 12, and a host 2303 is coupled to egress edge device 2271 via external port 852. Both hosts 2301 and 2302 are sending frames to host 2303 via the same virtual channel, forming frame streams traveling on links 2401 and 2402, respectively. Frame streams on links 2401 and 2402 are indicated by different fill patterns in FIG. 2C. Assume further that (1) the hosts can transmit frames as fast as core switch fabric allow, (2) edge-to-edge flow control is optionally disabled, and (3) only link-level flow control (such as an FC-like credit mechanism) is available. In other words, egress edge device 2271 only maintains one output queue for its egress port 852 and does not distinguish the source (i.e., the ingress edge device) of the frames stored in this queue.

When a frame within the stream on link 2401 is lost, the output queue for egress port 852 can quickly fill up with frames from host 2301. As a result, the buffer in core switching device 2100 corresponding to streams 2401 and 2402 can fill up and reduce the otherwise usable switching capacity. Meanwhile, before the back pressure can be propagated back to ingress edge devices 2200 and 2201, they will continue to transmit frames to core switching device 2100 and cause congestion at the core. This type of congestion caused by head-of-queue blocking can be effectively prevented using the edge-to-edge flow control.

Figure 2D:
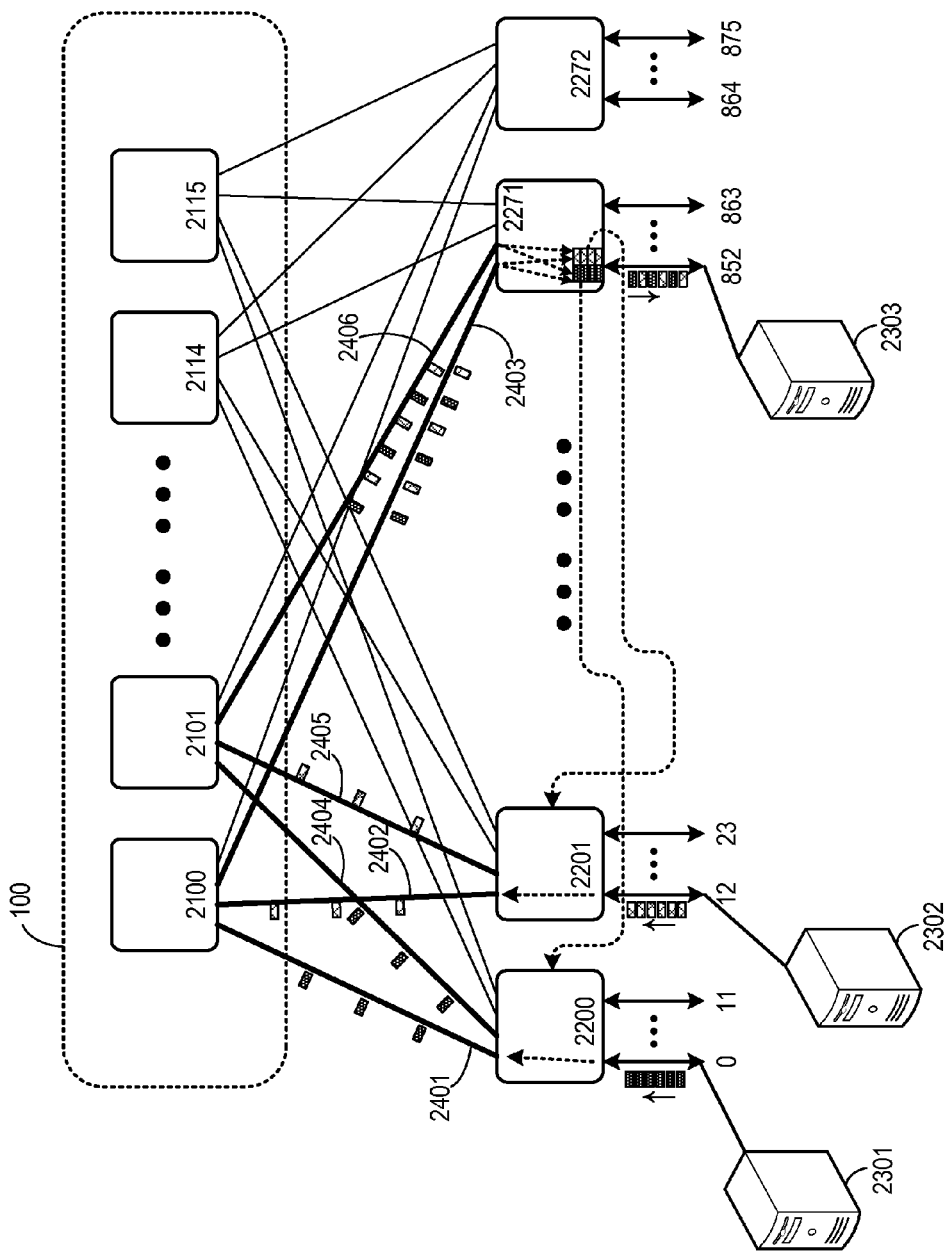
FIG. 2D illustrates an exemplary configuration of a multi-path switching system with edge-to-edge flow control enabled, in accordance with an embodiment of the present invention.

FIG. 2D illustrates an exemplary configuration of a multi-path switching system with edge-to-edge flow control enabled, in accordance with an embodiment of the present invention. In this example, the frames from host 2301 to host 2303 are sprayed across two core switching devices 2100 and 2101, over links 2401 and 2404, respectively. Similarly, the frames from host 2302 to host 2303 are sprayed across core switching devices 2100 and 2101 over links 2402 and 2405, respectively. The frames from host 2301 are marked with a different fill pattern from the frames from host 2302.

With respect to egress port 852 which couples to host 2303, egress edge device 2271 provides separate queues for hosts 2301 and 2302. In addition, egress edge device 2271 regularly communicates the state of these queues to their respective ingress edge device. For example, if a frame from host 2301 is lost and the corresponding egress queue is backed up, host 2301 can be timely notified by egress edge device 2271 and stop sending frames to core switching devices 2100 and 2101, thus avoiding congestion in the core. Meanwhile, because there are separate egress queues for hosts 2301 and 2302, the egress queue for host 2302 is not affected by the status of the queue for host 2301. As a result, frames from host 2303 can continue to be delivered to host 2303 without any head-of-queue blocking problems.

Queue Management

As mentioned above, an egress edge device maintains a separate queue for every (egress port, ingress edge device) pair. This queue configuration allows edge-to-edge flow control between an egress port and each ingress edge device.

Figure 3:
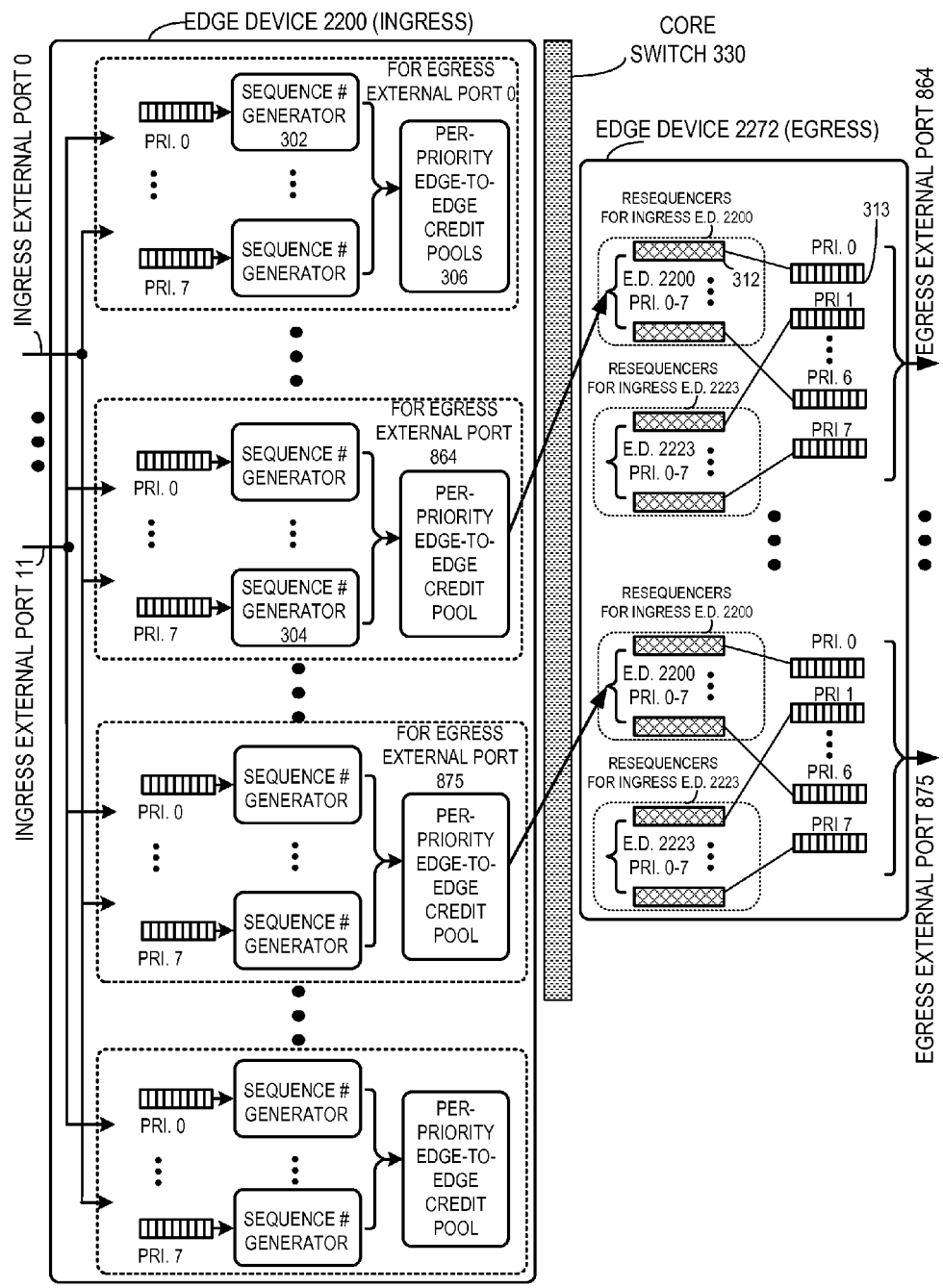
FIG. 3 presents a block diagram illustrating the credit-based mechanism which facilitates edge-to-edge flow control with multi-path switching, in accordance with an embodiment of the present invention.

FIG. 3 presents a block diagram illustrating the credit-based mechanism which facilitates edge-to-edge flow control with multi-path switching, in accordance with an embodiment of the present invention. This example corresponds to the configuration in FIG. 2B and illustrates the queue management within an ingress edge device 2200 and an egress edge device 2272 as illustrated in FIG. 2B. The outgoing frames from edge device 2200 are switched by one or more core FC switches 330 and arrive at the egress edge devices, such as edge device 2272.

In general, within an ingress edge device, the sequence number generators aggregate the traffic of the same priority from the 12 ingress external ports that is destined to an egress external port into a single flow. As frames are dequeued from this flow, they are tagged with the sequence number that is uniquely identifiable based on the ingress edge device, frame priority, and egress external port. Then, the frames of eight levels of priorities destined to a single egress external port use the credits in eight different per-priority edge-to-edge credit pools to traverse the core switch fabric. Upon arrival at the egress edge device, the frames enter respective resequencers where they are queued as needed to re-order the flow before being passed to the egress external port's output queues.

For example, ingress edge device 2200 has 12 ingress external ports, labeled as 0, 1, 2, . . . , 11, respectively. In one embodiment, these ingress external ports are Ethernet ports. Within edge device 2200, incoming Ethernet frames with the same priority and destined to the same egress external port (on an egress edge device) are served with the same sequence number generator. In this example, there are eight levels of priorities, labeled as level 0, 1, . . . , 7, respectively. For instance, sequence number generator 302 serves all the incoming frames which have priority 0 and are destined for egress external port 0. Sequence number generator 304 serves all the incoming frames which have priority 7 and are destined to egress external port 864. In addition, for the frames destined to a given egress external port, there are a number of edge-to-edge credit pools, each of which serves a different priority. These credit pools provide the credit-based edge-to-edge flow control in conjunction with the FC core switches for different traffic priorities. For example, edge-to-edge credit pools 306 (which contains eight separate per-priority credit pools) serves the frames of the eight priorities destined to egress external port 0.

On the egress side, for example at egress edge device 2272, there is one resequencer for each combination of ingress edge device, external egress port, and priority. For example, resequencer 312 re-orders all the priority-0 frames from ingress edge device 2200 and destined to egress external port 864. Each resequencer is associated with a queue, and all the resequencer queues corresponding to a (egress port, ingress edge device pair) form the total edge-to-edge queue.

In one embodiment, a resequencer includes a time-out mechanism that allows subsequent frames with higher sequence numbers to advance when a frame is missing for a time-out period. After the frames destined to a given egress external port are re-ordered, they are forwarded to respective output queues based on their priorities. For example, output queue 313 stores outgoing frames of priority 0 for egress external port 864. Subsequently, the transmitter dequeues the frames from each output queue based on their respective priorities.

In general, an ingress edge device maintains a counter for each egress port to indicate the available edge-to-edge credit for transmitting frames into the core switch fabric. An ingress edge device can also keep track of the total edge-to-edge credit available to all the egress external ports at an egress edge device, because the ingress edge device receives queue status for every (egress port, ingress edge device) pair from a respective egress device (see description in conjunction with FIG. 1).

In one embodiment, an ingress edge device can allow oversubscription in the egress edge device. When oversubscription is permitted, a frame is allowed to be transmitted from the ingress edge device when the destination egress edge device's total credit (sum of the egress edge device's credit over its 12 egress external ports with respect to the ingress edge device, in terms of bytes or bits) is greater than or equal to the maximum frame size, and when the destination egress port's credit (with respect to the ingress edge device) is greater than one buffer unit. Upon transmission of the frame, the destination egress port's edge-to-edge credit is decremented by the maximum frame size (thus reducing the destination egress edge device's total available credit as well). When the frame is successfully transmitted from the egress port on the egress edge device, the pessimism in the frame's assumed size (i.e., the assumption that the frame has the maximum size) is compensated for by granting the difference between the maximum frame size and the actual frame size back to the egress port's edge-to-edge credit pool.

The scheme described above allows an egress port to use more than its allowed credit by up to one maximum-sized frame. However, the total oversubscription does not exceed what is granted across all 12 egress ports on the egress edge device.

At the destination egress edge device, when a frame is transmitted, the edge-to-edge credit is accounted on a per-priority and per-egress-port basis. Each time a frame travels in the reverse direction (relative to the unidirectional flow model), the accumulated "released credit counter" value is piggybacked on these frames sent to the ingress edge device, and the "released credit counter" is decremented. Correspondingly, the ingress edge device extracts the credit release information and increments its edge-to-edge credit pool for a given priority.

In order to return edge-to-edge credit to a source edge device, the credit-return mechanism ideally needs some amount of traffic in the reverse direction to piggyback the credit information. In the absence of such traffic, an egress edge device can create an empty frame to achieve this purpose. For example, when the egress edge device detects that the edge-to-edge credit for a particular ingress edge device has accumulated for too long without being returned to the ingress edge device, it can send an empty frame to the ingress edge device so that these accumulated credits can be used.

It is possible that the edge-to-edge credit can be lost when a frame is lost while traversing the core switching fabric or otherwise corrupted such that it does not reach an edge device. Consequently, an ingress edge device could have insufficient credit to transmit frames.

In one embodiment, an edge device includes a "no-credit" timer mechanism to detect when a transmission queue fails to receive sufficient credit to transmit a maximum-sized frame. Ideally, the duration of this timer is sufficiently long to flush all frames out of the core switching fabric. Upon expiration of this timer, an interrupt is triggered, and the transmission queues whose edge-to-edge credit pools are depleted are disabled. The edge device then adjusts a respective edge-to-edge credit pool to account for the lost credit. In one embodiment, the edge device offsets a "consumed credit register" from the current "returned credit counter" by the amount of desired credit to be available. Ideally, at the egress edge device, the "released credit counter" is equal to the "returned credit counter." If they are not, the "released credit counter" is set to the value of the "returned credit counter." Subsequently, the transmission queues at the ingress edge device are re-activated.

In addition to the mechanism to compensate for lost credits, an edge device can also include mechanisms to detect too much credit and credit leakage. For example, an edge device can limit the difference between the "returned credit" value and "returned credit" value to a pre-programmed value. The edge device can also initiate a timer when the available credit falls below a programmable threshold to prevent the credit from being below the threshold for too long.

Frame Format

Figure 4:
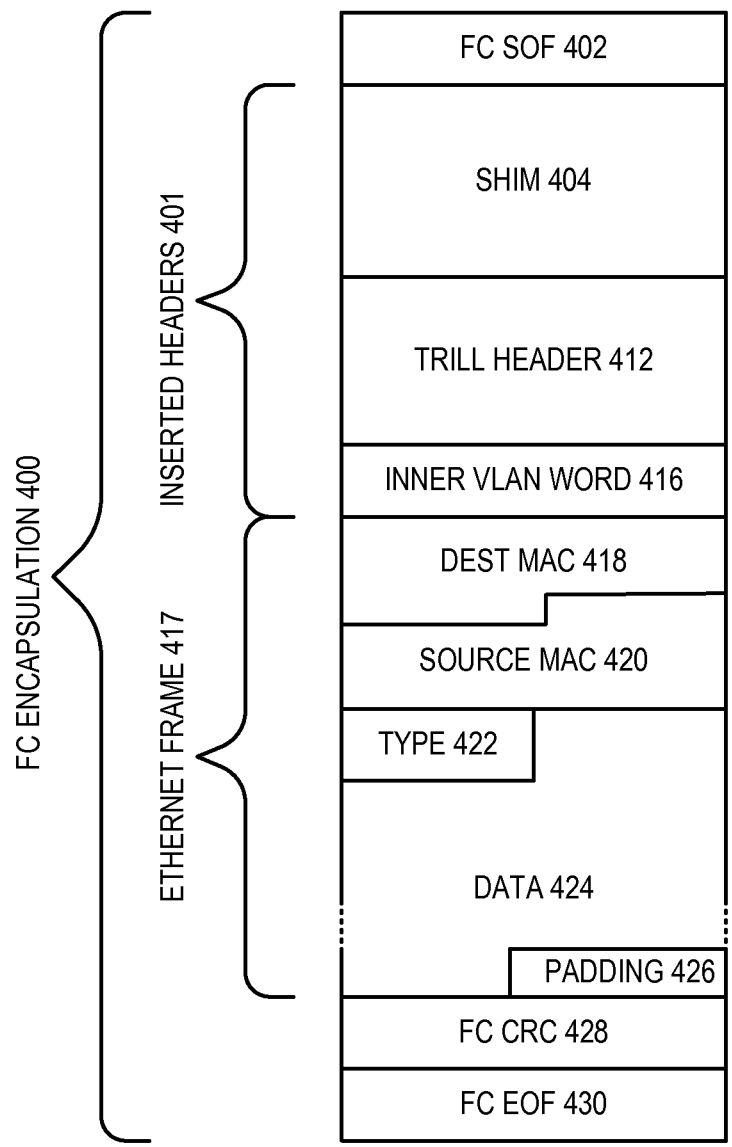
FIG. 4 illustrates an exemplary frame format which includes shim headers to facilitate edge-to-edge flow control, in accordance with an embodiment of the present invention.

FIG. 4 illustrates an exemplary frame format which includes shim headers, in accordance with an embodiment of the present invention. In this example, an FC-encapsulated frame 400 includes the FC headers, a number of inserted headers 401, and an Ethernet frame 417. The FC headers include an FC start-of-frame field 402, an FC checksum (cyclic-redundancy-check, or "CRC") field 428, and an FC end-of-frame field 430. Ethernet frame 417 can include a destination Medium Access Control (MAC) address 418, a source MAC address 420, an Ethertype field 422, Ethernet data 424, and a padding field 426.

Inserted headers 401 include a shim header 404 and, optionally, a TRILL (Transparent Interconnection of Lots of Links) header 412 and an inner virtual LAN (VLAN) word 416. Shim header 404 can include the edge-to-edge credit information and a sequence number which is used by the edge devices to re-order received frames. Shim header 404 can include additional information to facilitate the routing and forwarding operations at the core FC switch. In one embodiment, shim header 404 includes FC address information. Note that the core switching devices can be based on other formats than FC. Correspondingly, shim header 404 can include routing information associated with different formats.

TRILL header 412 can facilitate link-state routing with Ethernet frames. More details of the TRILL protocol can be found at http://www.ietf.org/html.charters/trill-charter.html. VLAN word 416 allows various end devices to form a virtual LAN. Note that both TRILL header 412 and VLAN word 416 are optional.

In some embodiments, data portion 424 of Ethernet frame 417 can encapsulate Fibre Channel over Ethernet (FCoE) content. In this case, Ethertype field 422 carries a special value that indicates that the content in data field 424 carries an encapsulated FC frame. Note that the FCoE in data field 424 is separate from FC encapsulation 400.

Operation of Edge Device

Figure 5:
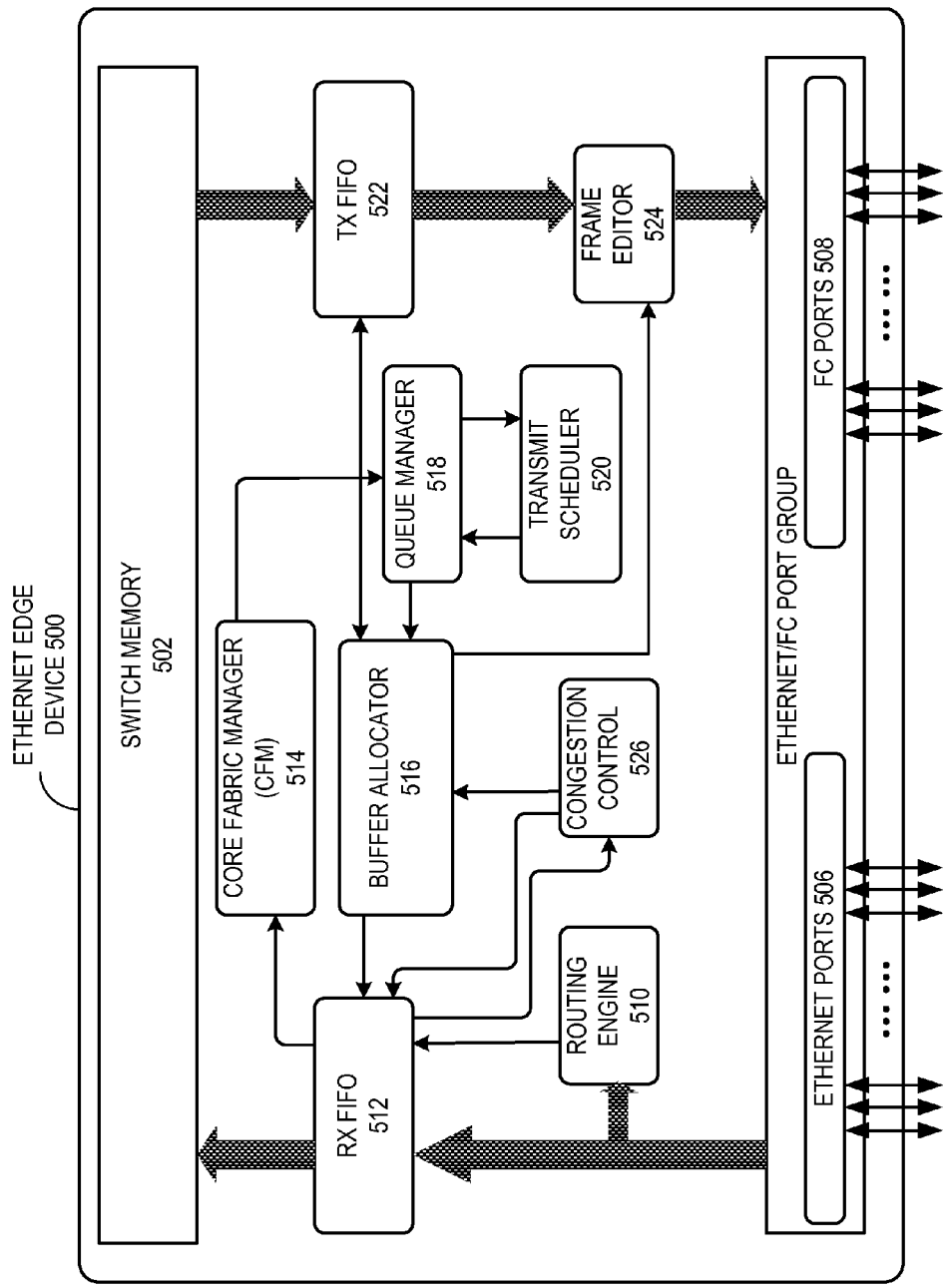
FIG. 5 illustrates an exemplary architecture of an edge device which facilitates multi-path switching with edge-to-edge flow control, in accordance with an embodiment of the present invention.

FIG. 5 illustrates an exemplary architecture of an edge device which facilitates multi-path switching with edge-to-edge flow control, in accordance with an embodiment of the present invention. In this example, an edge device 500 includes a set of Ethernet-based external ports 506 and a set of FC-based fabric ports 508. Note that fabric ports 508 can also be based on other frame formats. Also included in edge device 500 is a main switch memory 502, a routing engine 510, a receiver first-in-first-out (FIFO) queue 512, a core fabric manager (CFM) 514, a buffer allocator 516, a congestion controller 526, a queue manager 518, a transmit scheduler 520, a transmit FIFO queue 522, and a frame editor 524.

When a frame arrives either from an external port or a fabric port, the header information is extracted from the frame and fed into a routing engine 510, which determines how to forward the frame. The received frame is then temporarily staged in receiver FIFO queue 512. Meanwhile, congestion controller 526 manages link level credits and monitors the usage of receiver FIFO queue. Congestion controller 526 can maintain the buffer status in one or more registers. Congestion controller 526 also reports the buffer status to buffer allocator 516. Buffer allocator 516 is responsible for maintaining a pool of free buffer identifiers and servicing buffer-allocation and de-allocation requests from main switch memory 502 and queue manager 518. Buffer allocator 516 also manages the queuing and de-queuing in receiver FIFO queue 512 and transmit FIFO queue 522.

After the frame received from a fabric port enters receiver FIFO queue 512, CFM 514 re-orders the frames based on their respective sequence number, ingress edge device, priority, and external egress port. CFM 514 is also responsible for managing the end-to-end credit passed from the egress edge device. In one embodiment, CFM 514 maintains a counter for each egress external port on the egress devices to indicate the available end-to-end credit for transmission into the fabric. In addition, it also keeps track of the total end-to-end credit available to all the egress external ports on each egress edge device.

In one embodiment, to improve network utilization, a frame is allowed to be dequeued anytime the egress edge device's total credits for the corresponding ingress edge device (sum of credits for all the egress external ports on the egress edge device with respect to the ingress edge device) is greater than or equal to a maximum-sized frame (e.g., in terms of number of bits) and when the destination egress external port's available credit is greater than one buffer unit (e.g., 1 bit). Upon dequeue, the destination egress external port's credit is decremented by the maximum frame size (thus reducing the destination egress edge device's total available credit for the corresponding ingress edge device). When the frame transmission is completed, the pessimism in the frame's assumed size is removed and the difference between the maximum size and the actual frame size is granted back to that destination port's edge-to-edge credit pool.

This scheme allows an egress external port to use more than it's allowed credit (by up to one maximum sized frame). Nevertheless, the total amount of over-subscription does not exceed what is granted across all egress external ports on the destination egress edge device.

At the destination egress edge device, when the frame is transmitted via an egress external port, the corresponding edge-to-edge credit is accounted for on a per-ingress-edge-device basis for later return. Each time a frame travels in the reverse direction, the accumulated "released credit" value is piggybacked on those frames sent to the ingress edge device.

Subsequently, the ingress edge device extracts the credit release information and increments its per-priority transmission edge-to-edge credit pool.

With reference to FIG. 5, after a received frame is de-queued from receiver FIFO queue 512, the frame is sent to main switch memory 502. Switch memory 502 provides the cross-bar interconnect and facilitates low-latency switching between the 28 ports (12 external ports and 16 fabric ports). In one embodiment, switch memory 502 can provide temporary storage for frames while routing engine 510 decides the destination of the frame and while queue manager 518 and transmit scheduler 520 prepare to transmit the frame on the egress port. After the frame is processed by switch memory 502, it enters the transmit FIFO queue 522. Subsequently, the frame is de-queued from transmit FIFO queue 522, based on the per-priority edge-to-edge credit pool and optionally link-level credits (for frames traveling to the core fabric), and is edited by frame editor 524. Frame editor 524 is responsible for adding additional header information to a frame when the frame is to be FC-encapsulated, or removing the header information from a frame when the frame is to be de-capsulated.

Figure 6:
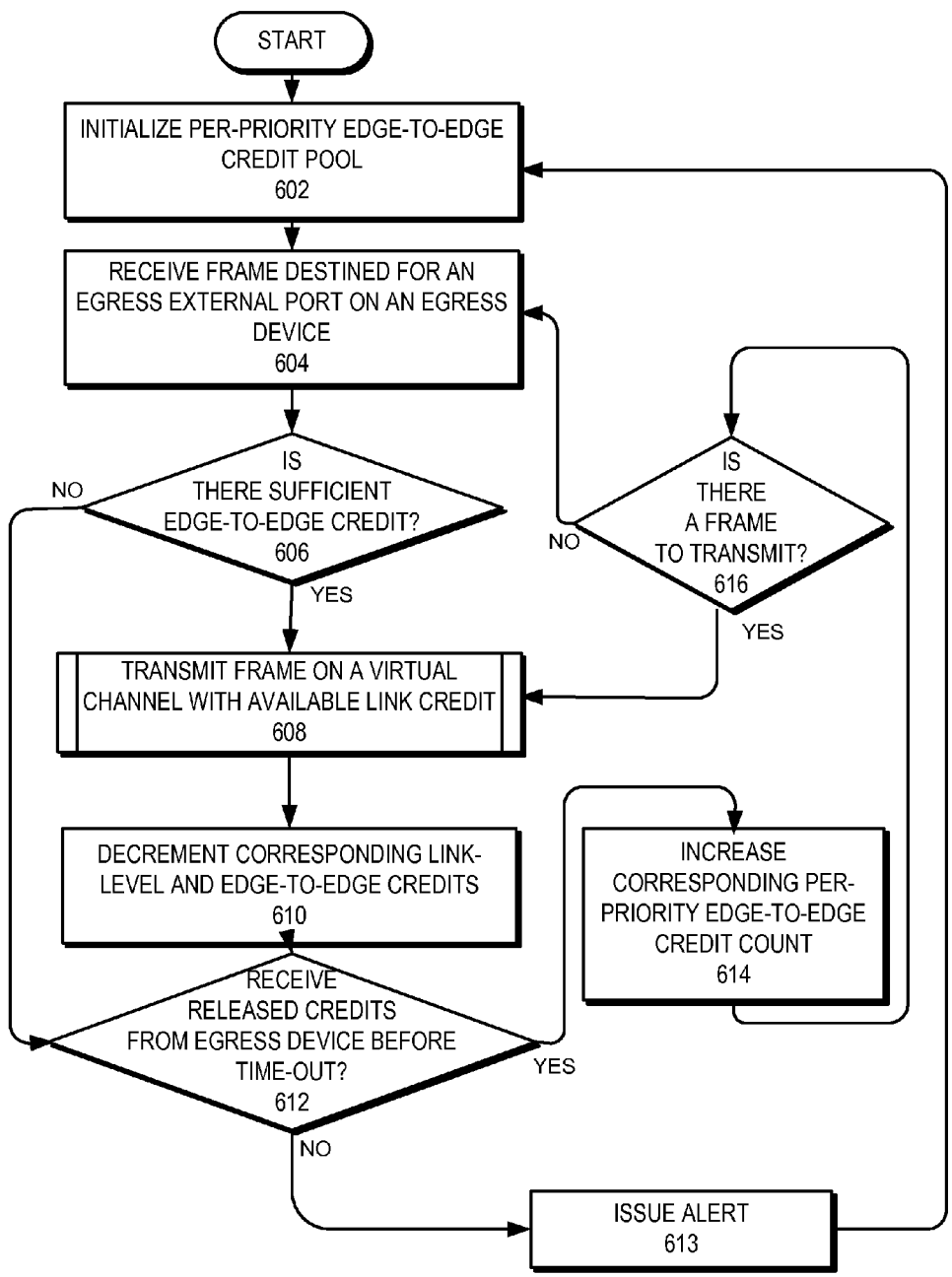
FIG. 6 presents a flowchart illustrating the process of forwarding a data frame while maintaining edge-to-edge flow control, in accordance with an embodiment of the present invention.

FIG. 6 presents a flowchart illustrating the process of forwarding a data frame while maintaining edge-to-edge flow control, in accordance with an embodiment of the present invention. During operation, an ingress edge device initializes a per-priority edge-to-edge credit pool for a respective egress external port on an egress edge device (operation 602). The ingress edge device then receives a frame destined for that egress external port (operation 604). The ingress edge device then determines whether there is sufficient edge-to-edge credit (operation 606). If so, the ingress edge device transmits the frame on a virtual channel with available link credit (operation 608), and decrements the corresponding link-level and edge-to-edge credits (operation 610). (The management of link-level credits is described in more detail in conjunction with FIG. 7) If there is insufficient edge-to-edge credit, the ingress edge device determines whether it has received released credits from the egress edge device before a predetermined time-out period (operation 612).

If no released credit is received before time-out, the ingress edge device may infer that there is a failure has occurred on the path between the egress edge device and the ingress edge device. Correspondingly, the ingress edge device can issue an alert (operation 613) and initialize the per-priority edge-to-edge credit pool again (operation 602).

If released edge-to-edge credits are received before time-out, the ingress edge device can increase the edge-to-edge credit count (operation 614). Subsequently, the ingress edge device determines whether there is a frame to transmit (operation 616). If there is at least one frame to transmit, the ingress edge device proceeds to transmit the frame on an available virtual channel to the switch fabric, which is described in more detail in conjunction with FIG. 7 (operation 608). Otherwise, the ingress edge device waits for the next frame to arrive (operation 604).

Figure 7:
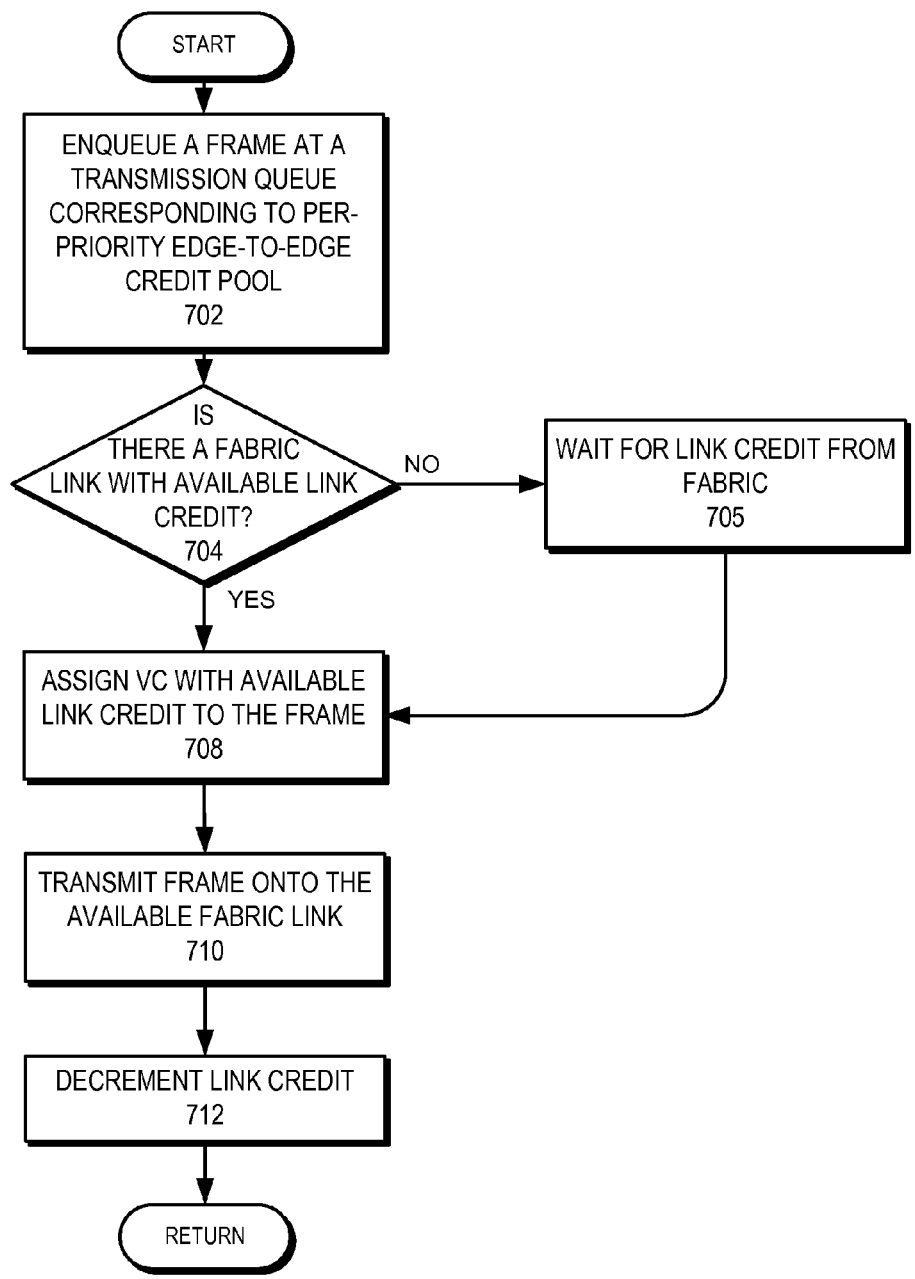
FIG. 7 presents a flowchart illustrating the process of forwarding a data frame from an edge device to a fabric based on a per-priority edge-to-edge credit pool and fabric-link credits, in accordance with an embodiment of the present invention.

FIG. 7 presents a flowchart illustrating the process of forwarding a data frame from an edge device to a fabric based on a per-priority edge-to-edge credit pool and fabric-link credits, in accordance with an embodiment of the present invention. During operation, in ingress edge device enqueues a frame at a transmission queue corresponding to a per-priority edge-to-edge credit pool (operation 702). The ingress edge device then determines whether there is a fabric link with available link-level credit (operation 704). If there is no available fabric link, the ingress edge device waits for the link credits from the switch fabric (operation 705). If there is available link credit, the ingress edge device assigns a virtual channel with available link credit to the frame (operation 708).

Subsequently, the ingress edge device transmits the frame onto the available virtual channel (operation 710). The ingress edge device then decrements the corresponding link credit (operation 712).

The examples presented herein are for illustration purposes only and should not limit the scope of this disclosure. In general, embodiments of the present invention provide a new type of switching systems which facilitate multi-path switching with both edge-to-edge and link-level flow control. Such a novel switching system can provide more efficient utilization of the switching capacity within a network with significantly reduced network congestion.

This new switching system is different from conventional flow control mechanisms (such as TCP flow control), because it allows a switch to transmit frames from the same stream or flow onto different paths, wherein each path may couple to a different switch and traverse multiple links. Furthermore, this switching system facilitates congestion avoidance on both path level and link level.

The methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them. The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
   maintaining at a switch a queue which stores a packet, wherein the packet includes a Transparent Interconnect of Lots of Links (TRILL) header;
   adding a shim header to the packet, wherein the shim header includes information indicating local congestion; and
   wherein the shim header is placed between the TRILL header and a start of frame field in the packet.

2. The method of claim 1, further comprising transmitting packets from the queue across different switched paths via a plurality of output ports of the switch, each of which is coupled to a different core switch and is part of a different switched path leading to an egress edge switch.

3. The method of claim 1, further comprising maintaining status of a queue at an egress edge switch.

4. The method of claim 1, further comprising receiving information from a received packet's shim header indicative of status of a queue at an egress edge switch, wherein the received packet is encapsulated by a TRILL header and transmitted from the egress edge switch.

5. The method of claim 1, further comprising receiving information indicative of status of a queue at an egress edge switch, wherein this information is contained in a stand-alone packet encapsulated by a TRILL header without payload data.

6. The method of claim 5, wherein the packet is an Ethernet frame encapsulated by the TRILL header.

7. The method of claim 5, wherein the queue status of the core switch is indicated by a Fibre Channel credit count.

8. The method of claim 1, further comprising transmitting the packet based on status of a queue at a core switch and status of a queue at an egress edge switch.

9. A switch, comprising:
a queue configured to store a packet, wherein the packet includes a TRILL header;
a header notification mechanism coupled to the queue and configured to add a shim header to the packet outside the TRILL header, wherein the shim header includes information indicating local congestion; and
wherein the shim header is placed between the TRILL header and a start of frame field in the packet.

10. The switch of claim 9, further comprising a queue status maintaining mechanism configured to maintain status of a queue at an egress edge switch, the queue corresponding to a destination device port on the egress edge switch and the ingress edge switch.

11. The switch of claim 9, further comprising a the flow-control mechanism configured to receive information from a received packet's shim header indicative of status of a queue at an egress edge switch, wherein the received packet is encapsulated by a TRILL header and transmitted from the egress edge switch.

12. The switch of claim 9, further comprising a flow-control mechanism configured to receive information indicative of status of a queue at an the egress edge switch, wherein this information is contained in a stand-alone packet encapsulated by a TRILL header without payload data.

13. The switch of claim 12, wherein the packet is an Ethernet frame encapsulated by the TRILL header.

14. The switch of claim 12, wherein the queue status of the core switch is indicated by an FC credit count.

15. The switch of claim 9, further comprising a transmission mechanism configured to transmit the packet based on status of a queue at a core switch and status of a queue at an egress edge switch.

16. A system for facilitating flow control of multi-path-switched packets encapsulated by a TRILL header, the system comprising:
an ingress edge switch, said ingress edge switch comprising:
a source device port for coupling to a packet source device to receive packets encapsulated by a TRILL header;
a plurality of core device ports for coupling to at least one separate core switch to provide packets encapsulated by a TRILL header;
queue status registers for storing status of queues between the ingress edge switch and said at least one core switch and queues between the ingress edge switch and a separate egress edge switch which is the destination of the received packets;
a flow-control mechanism coupled to the queue status registers and configured to determine a queue status of a respective core switch and status of a queue of a respective egress edge switch and provide values to the queue status registers;
a transmission mechanism coupled to the source device port, the core device ports, and the queue status registers and configured to transmit received packets encapsulated by a shim header added outside the TRILL header across different switched paths using different core device ports, wherein the shim header includes information indicating local congestion; and
wherein the shim header is placed between the TRILL header and a start of frame field in the packet;
at least one core switch; and
at least one egress edge switch.

17. The system of claim 16, wherein the egress edge switch comprises a queue that stores packets encapsulated by a TRILL header, the queuing dedicated to a destination device port on the egress edge switch and the ingress edge switch.

18. The system of claim 16, wherein the ingress edge switch is configured to receive information from a received packet's shim header indicative of the status of a queue in the egress edge switch; and
wherein the received packet is encapsulated by a TRILL header and transmitted from the egress edge switch.

19. The system of claim 16, wherein the ingress edge switch is configured to receive information indicative of status of a queue at an egress edge switch; and
wherein this information is contained in a stand-alone packet encapsulated by a TRILL header without payload data.

20. The system of claim 16, wherein the packet is an Ethernet frame encapsulated by the TRILL header.

21. The system of claim 16, wherein status of a queue in the core switch is indicated by an FC credit count.

* * * * *